(12) United States Patent
Taglioni

(10) Patent No.: US 6,452,505 B1
(45) Date of Patent: Sep. 17, 2002

(54) SYSTEM FOR MEASURING DOMESTIC CONSUMPTION OF ELECTRICITY, HEAT, WATER AND GAS

(75) Inventor: Daria Taglioni, Colle dei Marmi (IT)

(73) Assignee: Taglioni Communications S.A.S. di Taglioni Daria & C., Velletri (IT)

( * ) Notice: Subject to any disclaimer, the term of this patent is extended or adjusted under 35 U.S.C. 154(b) by 0 days.

(21) Appl. No.: 09/319,162

(22) PCT Filed: Oct. 2, 1998

(86) PCT No.: PCT/IT98/00273

§ 371 (c)(1),
(2), (4) Date: Jul. 29, 1999

(87) PCT Pub. No.: WO99/18553

PCT Pub. Date: Apr. 15, 1999

(30) Foreign Application Priority Data

Oct. 3, 1997 (IT) .......................................... T097A0883

(51) Int. Cl.[7] .............................................. G08B 23/00
(52) U.S. Cl. .................................. 340/870.02; 705/412
(58) Field of Search ....................... 340/870.02, 870.03, 340/870.07; 705/412; 700/286

(56) References Cited

U.S. PATENT DOCUMENTS

| | | | | |
|---|---|---|---|---|
| 3,731,277 A | * | 5/1973 | Krutz ..................... | 340/870.02 |
| 4,614,945 A | * | 9/1986 | Brunius et al. ......... | 340/870.03 |
| 4,803,632 A | * | 2/1989 | Frew et al. ............. | 340/870.02 |
| 4,940,976 A | * | 7/1990 | Gastiouniotis et al. . | 340/870.02 |
| 5,056,107 A | * | 10/1991 | Johnson .................. | 340/870.03 |
| 5,194,860 A | * | 3/1993 | Jones .................... | 340/870.02 |
| 5,239,575 A | * | 8/1993 | White ........................ | 379/107 |
| 5,438,329 A | * | 8/1995 | Gastouniotis et al. .. | 340/870.02 |
| 5,448,230 A | * | 9/1995 | Schanker ............... | 340/870.03 |
| 5,495,239 A | * | 2/1996 | Quellette ............... | 340/870.02 |
| 5,659,303 A | | 8/1997 | Adair, Jr. ............... | 340/870.18 |
| 5,953,371 A | * | 9/1999 | Rowsell ................. | 340/870.03 |
| 5,959,549 A | * | 9/1999 | Synesiou et al. ...... | 340/870.02 |

FOREIGN PATENT DOCUMENTS

| | | |
|---|---|---|
| DE | 4235187 | 4/1994 |
| EP | 0629098 | 12/1994 |

\* cited by examiner

Primary Examiner—Michael Horabik
Assistant Examiner—Albert K. Wong
(74) Attorney, Agent, or Firm—Liniak, Berenato, Longacre & White

(57) ABSTRACT

The system for determining domestic consumption of electricity, heat, water and gas includes: a number of measuring units (2) for measuring consumption of electricity, heat, water and gas; a concentration unit (4) connected to the measuring units (2) to acquire consumption data from the measuring units (2) and transmit the consumption data via radio; a mobile collecting unit (6) for collecting consumption data transmitted by the concentration unit (4); and a remote central processing unit (8) for collecting and processing the consumption data supplied by the mobile collecting unit (6).

12 Claims, 3 Drawing Sheets

SYSTEM FOR MEASURING DOMESTIC CONSUMPTION OF ELECTRICITY, HEAT, WATER AND GAS

TECHNICAL FIELD

The present invention relates to a system for determining domestic consumption of electricity, heat, water and gas.

BACKGROUND ART

As is known, domestic consumption of electricity, heat, water and gas is currently determined using-meters installed in individual homes, and which are read periodically by employees of the electricity, heat, water and gas supply companies.

On account of the number of homes to be covered, each company currently employs a large number of meter readers, who normally take a considerable time to read all the meters.

DISCLOSURE OF INVENTION

It is an object of the present invention to provide a system for determining domestic consumption of electricity, heat, water and gas, which provides for acquiring meter readings rapidly using a small number of employees.

According to the present invention, there is provided a system for determining consumption, characterized by comprising:

a number of measuring units for measuring consumption of at least one quantity selected from electricity, heat, water and gas;

a concentration unit connected to the measuring units to acquire consumption data from the measuring units and transmit the consumption data via radio;

a mobile collecting unit for collecting the consumption data transmitted by the concentration unit; and remote processing means for collecting and processing the consumption data supplied by the mobile collecting unit.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
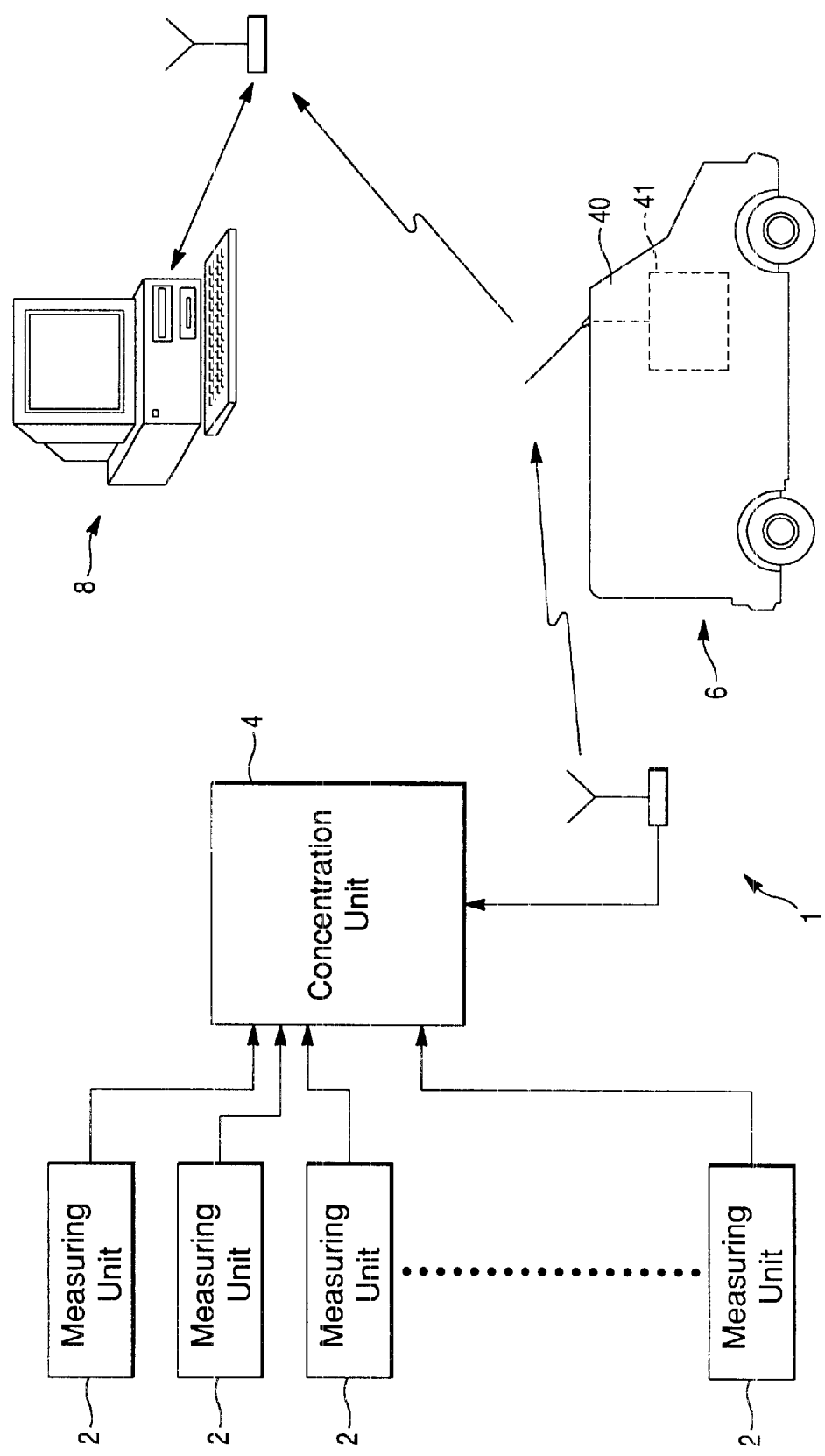
FIG. 1 shows a block diagram of the system according to the present invention.

Number 1 in FIG. 1 indicates as a whole a system for determining the consumption of electricity, heat, water and gas in any type of home, be it a house or an apartment in a condominium.

In the following description, system 1 is described, purely by way of example, with reference to consumption by apartments in a condominium.

System 1 comprises a number of measuring units 2 for measuring consumption of electricity, heat, water and gas, and each of which is associated with a respective apartment and provides for determining and memorizing the consumption of one of said quantities; a concentration unit 4 connected to measuring units 2, and which provides, for each apartment, for reading and memorizing the electricity, heat, water and gas consumption data memorized in measuring units 2, and, when activated, for transmitting the consumption data via radio; a mobile collecting unit 6 for collecting the consumption data transmitted by concentration unit 4, and which provides for activating concentration unit 4 via radio, for receiving and memorizing the consumption data transmitted by concentration unit 4, and for transmitting the collected consumption data via radio; and a remote central processing unit 8 for collecting and processing the consumption data transmitted by mobile collecting unit 6.

Figure 2:
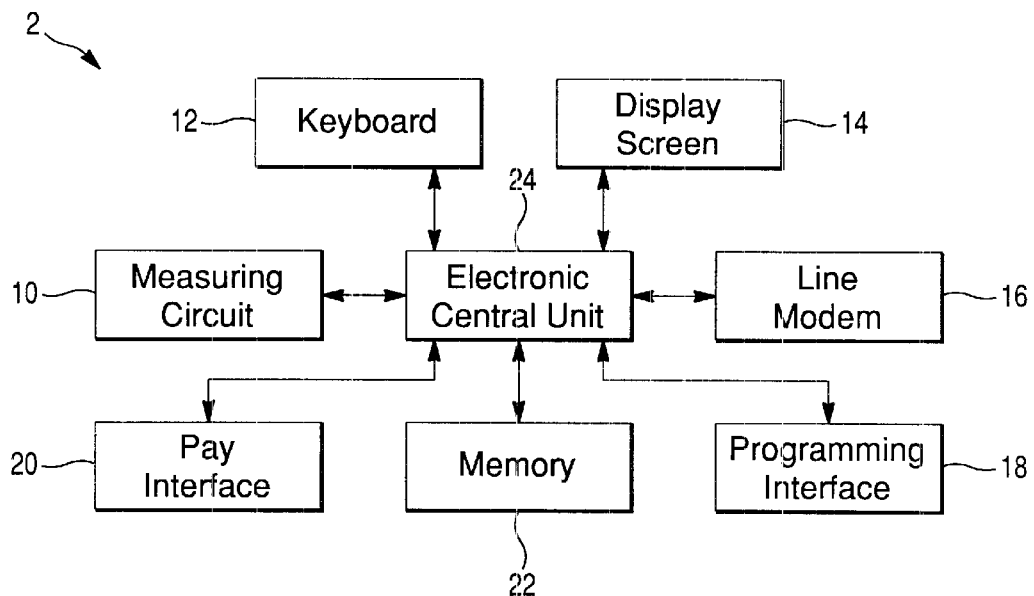
FIG. 2 shows a block diagram of a measuring unit forming part of the system according to the present invention.

As shown in detail in FIG. 2, each measuring unit 2 comprises a measuring circuit 10 for continuously determining consumption of the respective monitored quantity; a keyboard 12 and display screen 14, e.g. a liquid-crystal screen, for enabling real-time consumption reading by the user pressing a key on keyboard 12; a known line modem 16 for transmitting the data determined by measuring circuit 10 to concentration unit 4 over the electric lines-of each apartment; a programming interface 18 connecting measuring unit 2 to an external programming unit for entering user identification data and programming operation of measuring unit 2; a pay interface 20 for using a prepaid CHIP CARD; a memory 22 for storing the consumption data determined by measuring circuit 10 and user identification data; and an electronic central unit 24 connected to measuring circuit 10, keyboard 12, display screen 14, line modem 16, memory 22 and interfaces 18, 20, for controlling operation of measuring unit 2 and exchanging data and instructions with concentration unit 4, as described in detail later on.

Figure 3:
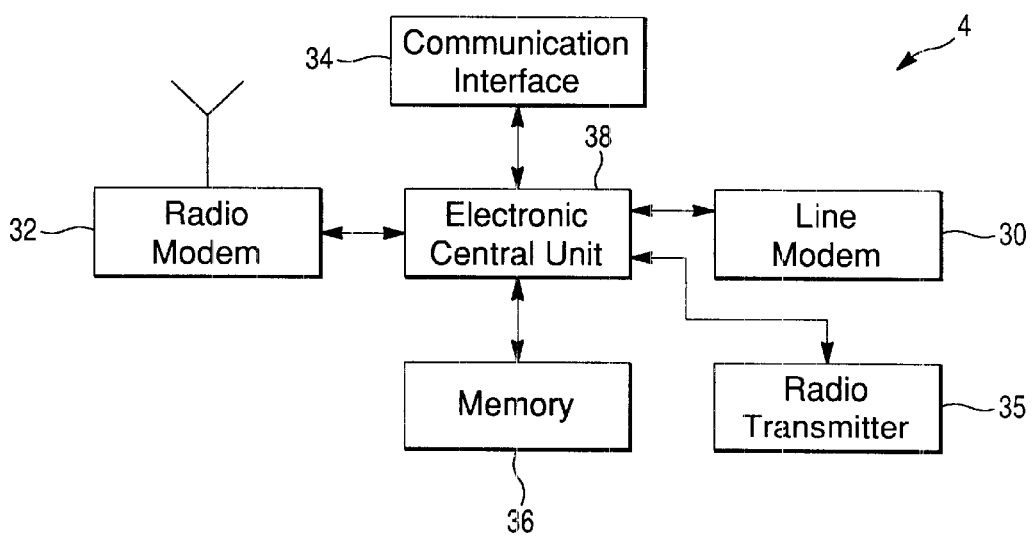
FIG. 3 shows a block diagram of a concentration unit forming part of the system according to the present invention.

Concentration unit 4 is located at the primary condominium supply node, and, as shown in detail in FIG. 3, comprises a known line modem 30 for transmitting instructions to, and receiving consumption data from, measuring units 2 over electric power lines; a known radio modem 32 for transmitting data and receiving instructions over a radio channel; a communication interface 34 for communicating with remote central processing unit 8 to exchange data and instructions over data communication networks (e.g. a private or switched telephone line); a known radio transmitter 35 for continuously transmitting a radio signal indicating the surface location of concentration unit 4; a memory 36 for storing the consumption data transmitted by measuring units 2 and user identification data; and an electronic central unit 38 connected to line and radio modems 30, 32, memory 36, radio transmitter 35 and communication interface 34, for controlling operation of concentration unit 4 and exchanging data and instructions with measuring unit 2 and mobile collecting unit 6, as described in detail later on.

When installing concentration unit 4, an operator by means of a GPS (Global Positioning System) receiver cooperating with the known satellite GPS—determines the absolute surface position (longitude and latitude) of concentration unit 4, and sets radio transmitter 35 to transmit a radio signal containing the above position data.

The radio signal transmitted continuously by radio transmitter 35 may therefore be picked up by anyone, in the vicinity of the condominium, equipped with an appropriate navigation system for real-time locating his/her own position.

As shown in FIG. 1, mobile collecting unit 6 comprises a vehicle 40, e.g. a van, which travels along predetermined routes and is equipped with a device 41 (shown by the dash line) for radio interrogating concentration units 4 in condominiums along its route, and for storing the consumption data contained in concentration units 4.

Figure 4:
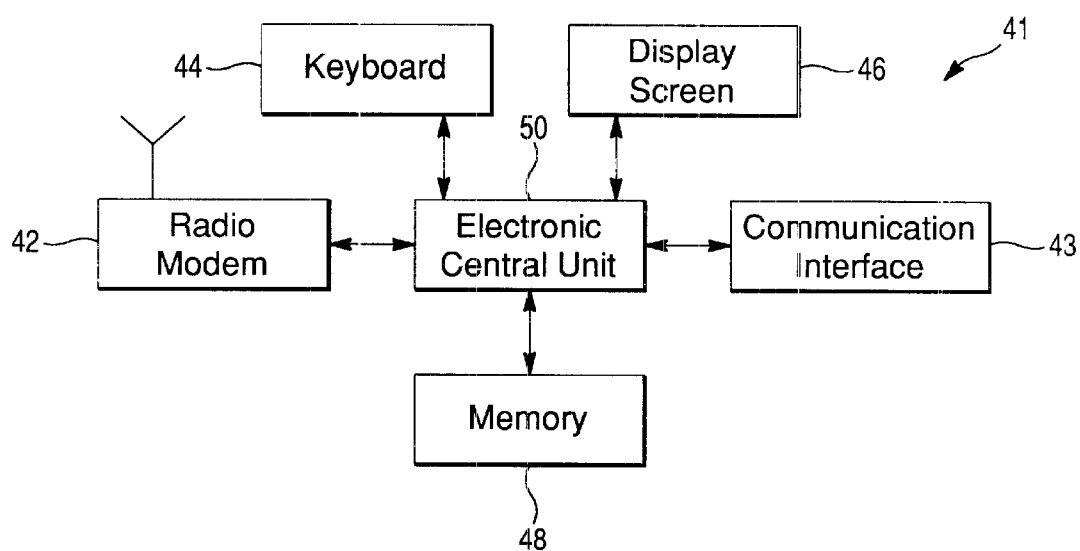
FIG. 4 shows a block diagram of a mobile data collecting unit forming part of the system according to the present invention.

As shown in detail in FIG. 4, device 41 of mobile collecting unit 6 comprises a known radio modem 42 for transmitting instructions to, and receiving data from, concentration units 4; a communication interface 43 for transmitting collected data to remote central processing unit 8; a keyboard 44 and display screen 46 for company personnel control of mobile collecting unit 6; a memory 48 for storing consumption data and user identification data transmitted by concentration units 4; and an electronic central unit 50 connected to radio modem 42, communication interface 43, memory 48, keyboard 44 and display screen 46, for controlling operation of mobile collecting unit 6 and exchanging data and instructions with concentration unit 4 and remote central processing unit 8, as described in detail later on.

Measuring unit 2 must be programmed whenever a user-company contract is stipulated or whenever changes are made to existing-user data.

Figure 5:
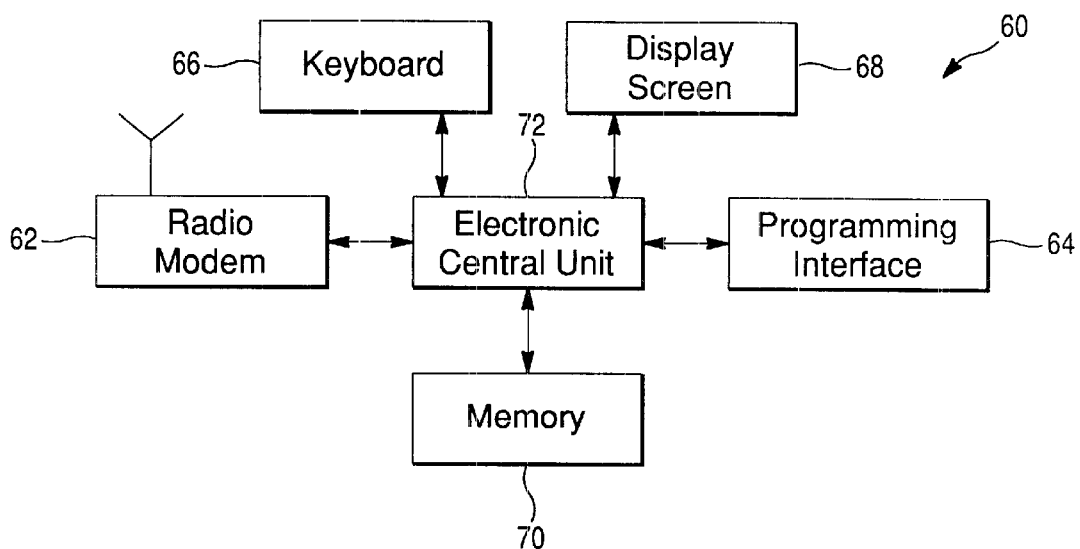
FIG. 5 shows a block diagram of a programming unit for programming the measuring unit.

To program the measuring unit, company personnel are issued with a programming unit 60 of the type shown in FIG. 5.

Programming unit 60 comprises a known radio modem 62 for transmitting data to concentration unit 4; a programming interface 64 connectable to programming interface 18 of measuring unit 2; a keyboard 66 and display screen 68 by which company personnel enter new user identification data; a memory 70 for storing new user data before it is sent to measuring unit 2; and an electronic central unit 72 connected to radio modem 62, programming interface 64, memory 70, keyboard 66 and display screen 68, for controlling operation of programming unit 60.

Programming unit 60 comprises a user-friendly software program by which the operator transmits the entered new-user identification data to measuring unit 2 via programming interface 64, which memorizes the data, and to concentration unit 4 via radio modem 62, which needs this data both to definitely identify measuring units 2 and to transmit measuring unit 2 identification data to mobile collecting unit 6.

System 1 for determining domestic consumption of electricity, heat, water and gas operates as follows.

Each measuring unit 2 determines consumption of the monitored quantity in real time by means of respective measuring circuit 10, and memorizes it in memory 22. Consumption data may be displayed on screen 14 at any time by the user simply pressing a key on keyboard 12. To reduce electricity consumption, electronic central unit 24 only activates the display screen for a few seconds when the key on keyboard 12 is pressed, and then turns the screen off.

The consumption data stored in memory 22 and the user identification data are transmitted to concentration unit 4 in response to an inquiry signal from concentration unit 4 itself.

Concentration unit 4 interrogates measuring units 2 at a predetermined time, which is a system 1 parameter entered when system 1 is installed.

To reduce the likelihood of mains noise induced by connected loads, data and inquiry signals between concentration unit 4 and measuring units 2 are preferably transmitted once a day, at times (e.g. at night) when user equipment is less likely to be connected to the electricity mains over which, as stated, the data and signals are transmitted.

As transmission is guided by concentration unit 4, there is also no possibility of data blocks colliding over the transmission medium.

Concentration unit 4 stores the data from each measuring unit 2 in memory 36 pending a radio-channel inquiry by mobile collecting unit 6. The consumption data in memory 36 of concentration unit 4 may also be used as backup data in the event the consumption data of measuring units 2 is lost.

Simultaneously with the inquiry signal, each measuring unit 2 is also supplied by concentration unit 4 with read time data in hours, minutes and seconds, which data is used by electronic central unit 24 of measuring unit 2 to synchronize the measuring unit's internal clock. As all the measuring unit 2 clocks are therefore synchronized with that of concentration unit 4, electronic central units 24 of measuring units 2 may disable respective line modems 16 until the predetermined time to dialog with concentration unit 4 draws near.

The inquiry signal and consumption data are received respectively by measuring units 2 and concentration unit 4 by means of respective line modems 16, 30 which employ known communication protocols not described in detail.

Measuring unit 2 also provides the user with an instant CHIP CARD pay service by means of pay interface 20. The CHIP CARD contains memorized user identification data and a memorized sum prepaid by the user, and which may be used, also in different places from the user's home, by simply passing the CHIP CARD through pay interface 20. In which case, electronic central unit 24 of measuring unit 2 records the user data and deducts consumption from the prepaid sum on the CHIP CARD.

By means of radio transmitter 35, concentration unit 4 also transmits continuously—over a different radio channel from that used to communicate with measuring units 2 and remote central processing unit 8 the radio signal containing information concerning the location of concentration unit 4; which signal may be picked up by anyone, in the vicinity of the condominium, equipped with an appropriate navigation system for real-time locating his/her own position.

As it travels past the condominium, mobile collecting unit 6, controlled by company personnel using keyboard 44 and display screen 46, sends an inquiry signal via radio modem 42 to concentration unit 4, which, in turn, supplies mobile collecting unit 6 with consumption data relative to the various apartments, and the user identification data memorized in memory 36.

Mobile collecting unit 6 then sends the above data for accounting to remote central processing unit 8 via communication interface 43, which may comprise standard electronic computer communication interfaces.

If data cannot be collected by mobile collecting unit 6, concentration unit 4 may be interrogated using communication interface 43 with which each concentration unit 4 is provided.

That is, remote central processing unit 8, located at the data collection center, sends an inquiry signal (e.g. by means of a straightforward telephone call) to concentration unit 4, which, in response to the inquiry signal, sends the consumption data stored in its memory over a data communication line.

The advantages of system 1 according to the present invention will be clear from the foregoing description.

In particular, system 1 according to the present invention provides for periodically determining consumption rapidly, easily, and using a small number of company employees.

Moreover, system 1 according to the present invention also provides for forestalling and in many cases preventing consumer fraud, and enables the companies supplying the above utilities to offer different time rates.

Moreover, system 1 according to the present invention is a valid alternative to the GPS by transmitting a radio signal containing information concerning the surface location of concentration unit 4, and so enabling real-time location of his/her own position by anyone equipped with an appropriate navigation system.

Clearly, changes may be made to system 1 as described and illustrated herein without, however, departing from the scope of the accompanying Claims.

For example, as opposed to transmitting consumption and user identification data to remote central processing unit 8, mobile collecting unit 6 may memorize the data, not only in memory 48, but also on a magnetic medium, e.g. a computer disk, which is handed over to personnel at the data collection center at the end of the data collection operation.

What is claimed is:

1. A system for determining consumption, characterized by comprising:
    a number of measuring units (2) for measuring consumption of at least one quantity selected from electricity, heat, water or gas; each of said measuring units comprise a prepayment interface for interacting with a chip card containing memorized user identification data and a memorized sum prepaid by a user;
    a concentration unit (4) connected to the measuring units (2) to acquire consumption data from the measuring units (2) and selectively transmit the consumption data via one of radio and a hard-wired data communication network;
    a mobile collecting unit (6) for collecting the consumption data transmitted by the concentration unit (4); and
    remote processing means (8) for collecting and processing the consumption data supplied by at least one of the mobile collecting unit (6) and the concentration unit (4),
    whereby said user is prevented from consuming said at least one quantity selected from electricity, heat, water or gas until said chip card interacts with said prepayment interface.

2. A system as claimed in claim 1, characterized in that each of said measuring units (2) comprises:
    measuring means (10) for continuously determining consumption data relative to consumption of said quantity;
    first line receiving and transmitting means (16) for transmitting said consumption data and identification data identifying the measuring unit (2) to said concentration unit (4) over electric lines; and
    first memorizing means (22) for memorizing said consumption data.

3. A system as claimed in claim 2, characterized in that each of said measuring units (2) also comprises:
    programming interface means (18) for connection to an external programming unit (60).

4. A system as claimed in claim 2, characterized in that each of said measuring units (2) also comprises:
    display means (14) for displaying consumption data; and
    enabling means (12) for enabling said display means (14).

5. A system as claimed in claim 1, characterized in that said concentration unit (4) comprises:
    second line receiving and transmitting means (30) for transmitting instructions to said measuring units (2), and for receiving said consumption data and said identification data identifying the measuring units (2) transmitted by said measuring units (2) over electric lines;
    second memorizing means (36) for memorizing the received said consumption data and said identification data; and
    first radio receiving and transmitting means (32) for receiving an incuiry signal from said mobile collecting unit (6) and transmitting said consumption data and said identification data over a radio channel to said mobile collecting unit (6) in response to said inquiry signal.

6. A system as claimed in claim 5, wherein said hard-wired data communication network defines a first communication interface means (34) for communicating with said remote processing means (8) to exchange data and instructions via said hard-wired data communication network in addition to said radio.

7. A system as claimed in claim 5, characterized in that said concentration unit (4) also comprises:
    radio transmitting means (35) for transmitting a signal containing information concerning the position of said concentration unit (4).

8. A system as claimed in claim 1, characterized in that said mobile collecting unit (6) comprises:
    a vehicle (40); and
    a device (41) for radio transmitting an inquiry signal to said concentration unit (4), and for receiving and memorizing the consumption data and identification data radio transmitted by the concentration unit (4) in response to said inquiry signal.

9. A system as claimed in claim 8, characterized in that said device (41) comprises:
    second radio receiving and transmitting means (42) for transmitting an inquiry signal over a radio channel to said concentration unit (4), and for receiving the consumption data and identification data transmitted by the concentration unit (4) in response to said inquiry signal; and
    third memorizing means (48) for memorizing the received said consumption data and said identification data.

10. A system as claimed in claim 9, characterized in that said device (41) also comprises:
    second communication interface means (43) for transmitting said consumption data and said identification data to said remote processing means (8).

11. A system as claimed in claim 9, characterized in that said device (41) also comprises:
    second display means (46); and
    first data entry means (44).

12. A system as claimed in claim 3, characterized in that said external programming unit (60) comprises:
    second data entry means (66) for entering programming data;
    third display means (68) for displaying said programming data;
    third radio receiving and transmitting means (62) for transmitting said programming data over a radio channel to said concentration unit (4);
    fourth memorizing means (70) for memorizing said programming data; and
    second programming interface means (64) for connecting each of said measuring units (2) to said first programming interface means (18).

* * * * *